(12) United States Patent
Eto et al.

(10) Patent No.: US 12,427,589 B2
(45) Date of Patent: Sep. 30, 2025

(54) METHOD FOR MANUFACTURING COMPONENT, PROCESSING APPARATUS, AND COMPONENT

(71) Applicant: MITSUBISHI HEAVY INDUSTRIES, LTD., Tokyo (JP)

(72) Inventors: Jun Eto, Tokyo (JP); Toshiyuki Tanaka, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 1174 days.

(21) Appl. No.: 17/268,759

(22) PCT Filed: Oct. 21, 2019

(86) PCT No.: PCT/JP2019/041383
§ 371 (c)(1),
(2) Date: Feb. 16, 2021

(87) PCT Pub. No.: WO2020/100536
PCT Pub. Date: May 22, 2020

(65) Prior Publication Data
US 2021/0323081 A1    Oct. 21, 2021

(30) Foreign Application Priority Data
Nov. 12, 2018  (JP) .................. 2018-212149

(51) Int. Cl.
*B23C 3/16*    (2006.01)
(52) U.S. Cl.
CPC ............ *B23C 3/16* (2013.01); *B23C 2215/04* (2013.01); *B23C 2220/00* (2013.01);
(Continued)
(58) Field of Classification Search
CPC ......... B23C 3/20; B23C 3/16; B23C 2220/08; B23C 2270/18
See application file for complete search history.

(56) References Cited

U.S. PATENT DOCUMENTS

| 4,260,304 A | 4/1981 | Jacobi |
| 5,378,091 A * | 1/1995 | Nakamura ......... B23Q 11/1023 409/132 |

(Continued)

FOREIGN PATENT DOCUMENTS

| JP | S59-143619 U | 9/1984 |
| JP | H09-292906 A | 11/1997 |

(Continued)

OTHER PUBLICATIONS

Machine translation of JP 2006-043858 A, which JP '858 was published Feb. 2006.*

(Continued)

*Primary Examiner* — Erica E Cadugan
(74) *Attorney, Agent, or Firm* — HAUPTMAN HAM, LLP

(57) ABSTRACT

The present invention is to eliminate formation of a shape that induces reduction of fatigue strength, without forming a step part, in a shape portion formed by machining. This processing apparatus includes end mills having bottom blades formed in a curved convex shape, and arcuately formed radial blades provided in corner areas; a drive section for driving the end mills; and a control unit for controlling the drive unit. The control unit includes a planar-shape-formation unit that controls the drive unit so as to form, in a workpiece, only a planar-shape portion adjacent to a fillet shape portion in such a manner that a portion of the shape to be processed corresponding to the fillet shape portion is left unprocessed; and a fillet formation unit that controls the drive unit so as to form the fillet shape portion in the workpiece in a single pass using the radial blades.

5 Claims, 5 Drawing Sheets

(52) U.S. Cl.
CPC ...... *B23C 2220/08* (2013.01); *B23C 2270/18* (2013.01); *Y10T 409/303808* (2015.01); *Y10T 409/304424* (2015.01); *Y10T 409/308568* (2015.01)

(56) References Cited

U.S. PATENT DOCUMENTS

| | | | |
|---|---|---|---|
| 6,779,270 B2 | 8/2004 | Sonti et al. | |
| 12,275,070 B2* | 4/2025 | Eto | B23C 5/10 |
| 2005/0025584 A1 | 2/2005 | Kolker et al. | |
| 2007/0245799 A1* | 10/2007 | Asakawa | B23C 3/20 72/356 |
| 2010/0172703 A1* | 7/2010 | Neubold | B23C 5/10 407/53 |
| 2014/0003873 A1* | 1/2014 | Han | B23C 5/10 407/54 |
| 2016/0256940 A1 | 9/2016 | Wu | |
| 2018/0009050 A1 | 1/2018 | Tokita et al. | |
| 2020/0016669 A1* | 1/2020 | Brambs | B23C 3/00 |
| 2021/0394284 A1* | 12/2021 | Eto | B23C 3/16 |
| 2022/0001466 A1* | 1/2022 | Eto | B23C 3/16 |
| 2025/0153254 A1* | 5/2025 | Eto | B23C 3/16 |

FOREIGN PATENT DOCUMENTS

| | | | |
|---|---|---|---|
| JP | 2002-059308 A * | 2/2002 | |
| JP | 2006-043858 A * | 2/2006 | |
| JP | 6168077 B2 | 7/2017 | |
| JP | 6265089 B2 | 1/2018 | |
| JP | 2021-146486 A * | 9/2021 | |
| WO | 2015/116398 A1 | 8/2015 | |

OTHER PUBLICATIONS

PCT/ISA/210, "International Search Report for International Application No. PCT/JP2019/041383," Dec. 24, 2019.

PCT/ISA/237, "Written Opinion of the International Searching Authority for International Application No. PCT/JP2019/041383," Dec. 24, 2019.

* cited by examiner

METHOD FOR MANUFACTURING COMPONENT, PROCESSING APPARATUS, AND COMPONENT

RELATED APPLICATIONS

The present application is National Phase of International Application No. PCT/JP2019/041383 filed Oct. 21, 2019, and claims priority from Japanese Application No. 2018-212149, filed Nov. 12, 2018.

TECHNICAL FIELD

The present disclosure relates to a method for manufacturing a component, a processing device, and a component.

BACKGROUND ART

Plate-like structural components for an aircraft, such as a skin of a fuselage or a main wing, have a shape that is partially thinned in a plate thickness direction for a reduction in weight. Since a rib is formed on one surface side of a plate-like component to ensure the strength of the plate-like component, a region of the plate-like component other than the rib is formed to be thin. For the improvement of strength, a connection portion between a planar portion and a rib-shaped portion does not have a pin angle without roundness and is provided with a fillet.

PTL 1 discloses a shape that can be regarded as a member to be connected by a fillet in a technical field related to welding.

CITATION LIST

Patent Literature

[PTL 1] Japanese Patent No. 6168077

SUMMARY OF INVENTION

Technical Problem

In the related art, machining using machining tools, such as a bull nose end mill and a ball end mill, is generally performed to form a fillet-shaped portion. However, since a predetermined shape cannot be obtained from machining using these machining tools due to a factor, such as a reduction in accuracy caused by the repeated operation of a machine, a change in temperature, vibration, or the distortion of a workpiece, there is a case where an error occurs on a formed component.

For example, in a case where an end mill 60 performs machining at a position shifted in an axial direction as shown in FIGS. 10 and 11 due to the above-mentioned factor, the end mill 60 machines a workpiece 50 so that a fillet-shaped portion is deeper or shallower than a planar portion. For this reason, there is a case where a shape including a stepped portion is formed. A case where the fillet-shaped portion 53 is formed to be deeper than the planar portion 52 as shown in FIG. 10 is called overcutting, and a case where the fillet-shaped portion 53 is formed to be shallower than the planar portion 52 as shown in FIG. 11 is called remaining uncutting.

As a result, there is a concern that the fatigue strength of a formed structural component may be reduced. Accordingly, prescribed values are set for the depth or height of a stepped portion, the position of a stepped portion from a rib, and the like with regard to a formed structural component, and whether or not a fillet-shaped portion fits a reference shape is checked. In a case where the fillet-shaped portion deviates from the reference shape, work for correcting a shape by additional work, such as sanding, is necessary.

The present disclosure has been made in consideration of the above-mentioned circumstances, and an object of the present disclosure is to provide a method for manufacturing a component, a processing device, and a component that do not form a shape causing a reduction in fatigue strength without forming a stepped portion on a shaped portion formed by machining.

Solution to Problem

A method for manufacturing a component according to a first aspect of the present disclosure is a method for manufacturing a component using a processing device including an end mill that includes a bottom edge formed in a curved convex shape and a radial edge provided at a corner and formed in a shape of an arc. The method includes: a step of forming only a planar portion, which is adjacent to a fillet-shaped portion, on a workpiece so that an unprocessed portion remains on the fillet-shaped portion of a shape as a processing target; and a step of forming the fillet-shaped portion on the workpiece by the radial edge in a single pass.

According to this configuration, the shape as a processing target to be formed on the workpiece includes the planar portion and the fillet-shaped portion adjacent to the planar portion. In a case where the planar portion is to be formed, only the planar portion is formed so that an unprocessed portion remains on the fillet-shaped portion. In a case where the fillet-shaped portion is to be formed, the fillet-shaped portion is formed in a single pass by the radial edge that is provided at a corner and formed in a shape of an arc.

Accordingly, the fillet-shaped portion and the planar portion can be formed in an ideal shape, which is the same as or close to a processing target, without the formation of a stepped portion on the fillet-shaped portion and the planar portion formed by machining.

In the first aspect, in a case where only the planar portion is to be formed, only the planar portion may be formed so that an unprocessed portion remains at a boundary portion between the fillet-shaped portion and the planar portion.

In the first aspect, a portion, which is unprocessed in a height direction and remains at a boundary portion between the fillet-shaped portion and the planar portion in a case where only the planar portion is formed, may be set to be larger than a portion that is unprocessed in the height direction by the radial edge and remains at the boundary portion in a case where the fillet-shaped portion is formed.

In the first aspect, a ridge portion protruding in a height direction may be formed at a portion where a newly formed planar portion overlaps with a planar portion formed in a previous pass in a case where the fillet-shaped portion is formed in a single pass.

A processing device according to a second aspect of the present disclosure includes an end mill that includes a bottom edge formed in a curved convex shape and a radial edge provided at a corner and formed in a shape of an arc, a drive unit that drives the end mill, and a control unit that controls the drive unit; and the control unit includes a planar portion formation unit controlling the drive unit so as to form only a planar portion adjacent to a fillet-shaped portion on a workpiece so that an unprocessed portion remains on the fillet-shaped portion of a shape as a processing target, and a fillet formation unit controlling the drive unit so as to form the fillet-shaped portion on the workpiece by the radial edge in a single pass.

A component according to a third aspect of the present disclosure includes a planar portion and a fillet-shaped portion that is adjacent to the planar portion and has curvature different from curvature of the planar portion. A convex portion is formed in a height direction on the planar portion side of a boundary portion between the fillet-shaped portion and the planar portion, and the planar portion and the fillet-shaped portion are formed of only smoothly curved surfaces without flat surfaces on the fillet-shaped portion side of the convex portion.

Advantageous Effects of Invention

According to the present disclosure, a stepped portion is not formed on a shaped portion formed by machining and a shape causing a reduction in fatigue strength is not formed.

DESCRIPTION OF EMBODIMENTS

An embodiment of the present disclosure will be described below with reference to the drawings.

Figure 1:
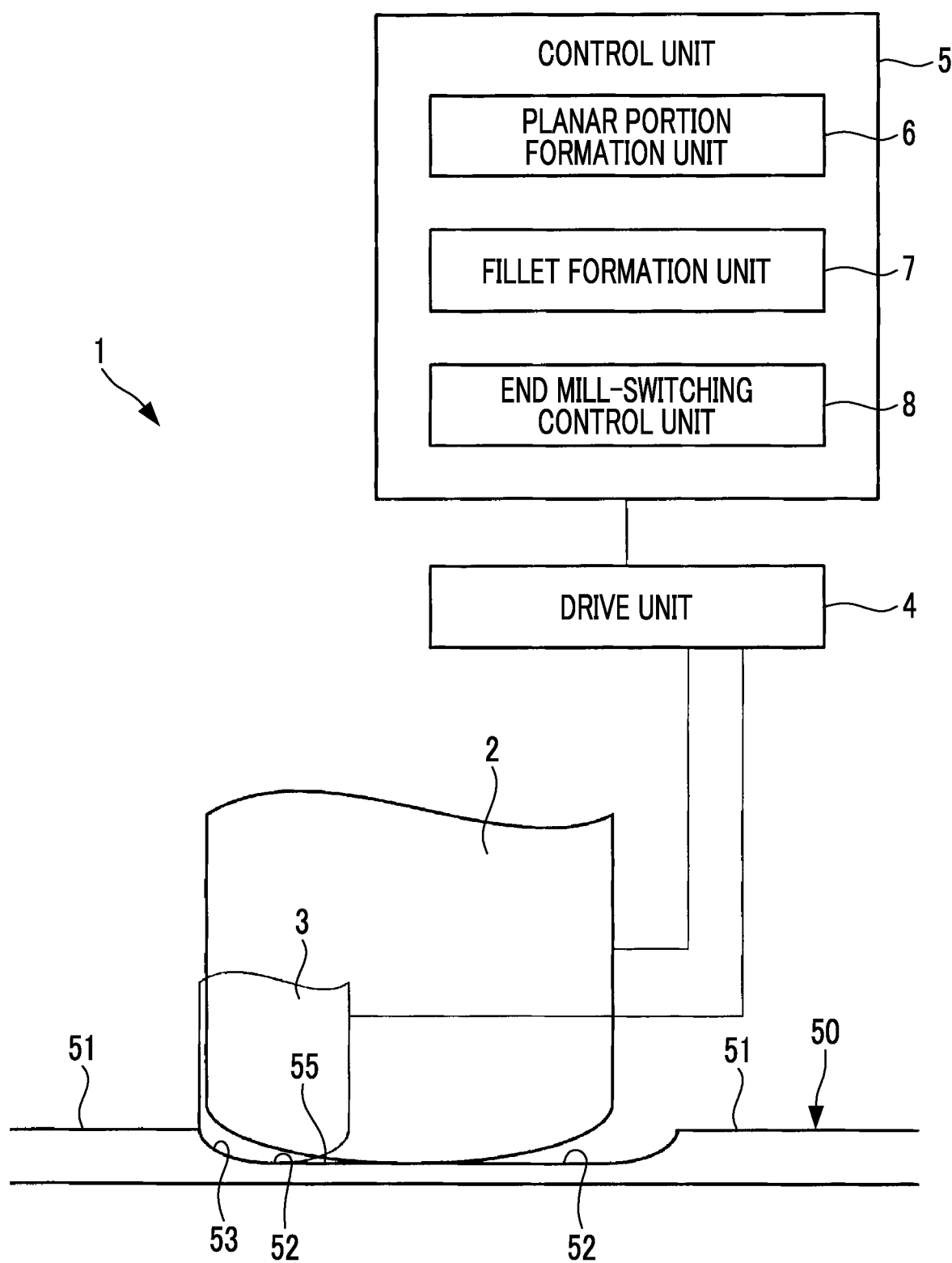
FIG. 1 is a diagram showing the configuration of a processing device according to an embodiment of the present disclosure.

As shown in FIG. 1, a processing device 1 according to the embodiment of the present disclosure includes, for example, end mills 2 and 3, a drive unit 4, and a control unit 5. The processing device 1 machines a workpiece 50 by the end mills 2 and 3 to form a predetermined shape on the workpiece 50. The predetermined shape of the present embodiment is particularly, a concave shape that is formed on the workpiece 50 in a depth direction. For example, the workpiece 50 is made of a metallic material, such as an aluminum alloy or a titanium alloy.

Figure 2:
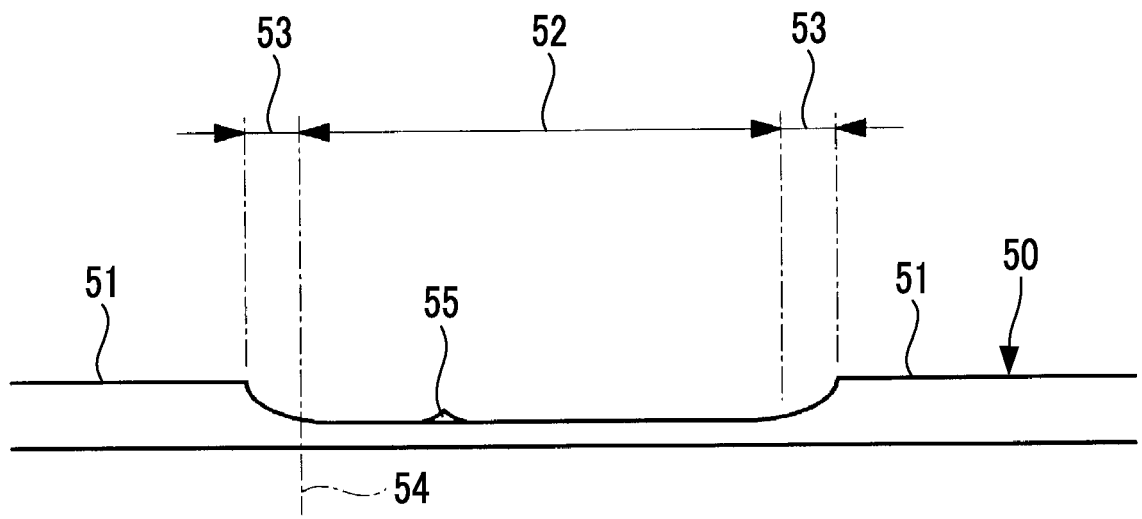
FIG. 2 is a longitudinal sectional view of a workpiece that is formed by the processing device according to the embodiment of the present disclosure.

As shown in FIGS. 1 and 2, for example, the workpiece 50 is a plate-like component and a rib 51 protruding in a height direction (thickness direction) is formed on one surface side of the workpiece 50 to ensure the strength of the workpiece 50. Accordingly, a region surrounded by the rib 51 is formed to be thin. In this case, a region of the rib 51 other than the uppermost surface has a concave shape. The concave shape includes a planar portion 52 that is formed at the bottom of a concave portion. Further, for the improvement of strength, a connection portion between the planar portion 52 and the rib 51 does not have a pin angle without roundness and is provided with a fillet-shaped portion 53.

The planar portion 52 may be a flat surface without a curvature, or may have the shape of a curved surface having curvature. The fillet-shaped portion 53 has the shape of an arc having a predetermined radius. One end side of the fillet-shaped portion 53 is formed to be continuous with the planar portion 52, and the other end side of the fillet-shaped portion 53 forms the side wall surface of the rib 51 or is formed to be continuous with the side wall surface of the rib 51.

A boundary portion 54 between the planar portion 52 and the fillet-shaped portion 53 is a portion where the curvature of the planar portion 52 (including the case of a flat surface of which the curvature is 0 (zero)) and the curvature of the fillet-shaped portion 53 are changed.

The end mills 2 and 3 can machine the workpiece 50 by being moved in a feed direction or an in-plane direction while being rotated about an axis.

Figure 3:
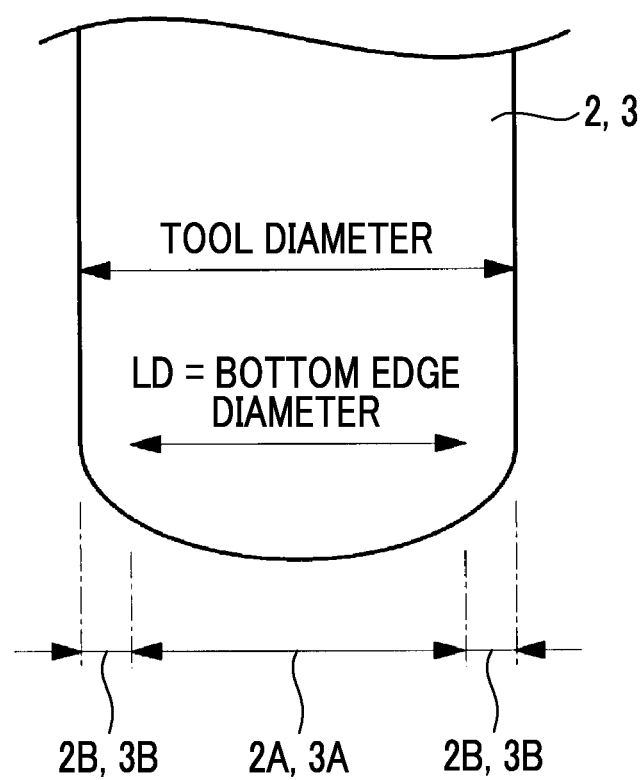
FIG. 3 is a schematic diagram showing end mills of the processing device according to the embodiment of the present disclosure.

As shown in FIG. 3, the end mills 2 and 3 include bottom edges 2A and 3A that are formed in curved convex shapes, and radial edges 2B and 3B that are provided at corners and are formed in the shapes of arcs.

The bottom edges 2A and 3A protrude so that portions of the end mills 2 and 3 positioned on the axes thereof are positioned at the lowermost positions, and are formed in the shapes of arcs having predetermined radii. The radial edges 2B and 3B are provided at the outer peripheral corners of the bottom edges 2A and 3A, and are formed in the shapes of arcs having predetermined radii. It is preferable that the radii of the arc-shaped portions of the radial edges 2B and 3B are equal to or close to the radius of the fillet-shaped portion 53 as a processing target. The radii of the arc-shaped portions of the bottom edges 2A and 3A are larger than the radii of the arc-shaped portions of the radial edges 2B and 3B. The radii of the arc-shaped portions of the bottom edges 2A and 3A are larger than the tool diameters (outer diameters) of the end mills 2 and 3, and are larger than the radius of the arc-shaped portion of a so-called ball end mill.

The drive unit 4 includes a plurality of motors, a switching unit that is adapted to switch the end mills 2 and 3, and the like. A spindle motor receives power and is driven, and rotates the end mill 2 about the axis thereof. A moving motor receives power and is driven, and moves the end mill 2 in an axial direction (feed direction) or a direction (in-plane direction) perpendicular to the axial direction. The switching unit switches the end mills 2 and 3 under the control of the end mill-switching control unit 8, and sets the end mill 2 or the end mill 3, which is to perform machining, on the workpiece 50.

The control unit 5 includes, for example, a planar portion formation unit 6, a fillet formation unit 7, an end mill-switching control unit 8, and the like.

The planar portion formation unit 6 controls the drive unit 4 so as to form the planar portion 52 of a shape as a processing target to be formed on the workpiece 50 by the bottom edges 2A.

Figure 4:
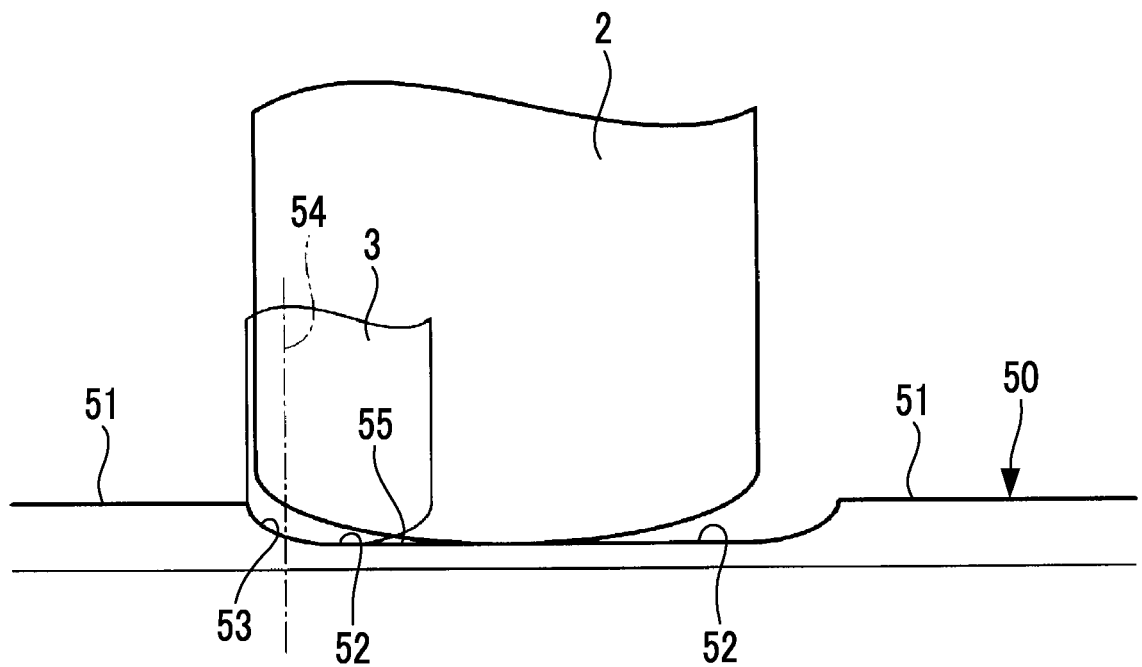
FIG. 4 is a longitudinal sectional view showing the end mills of the processing device according to the embodiment of the present disclosure and the workpiece.
Figure 5:
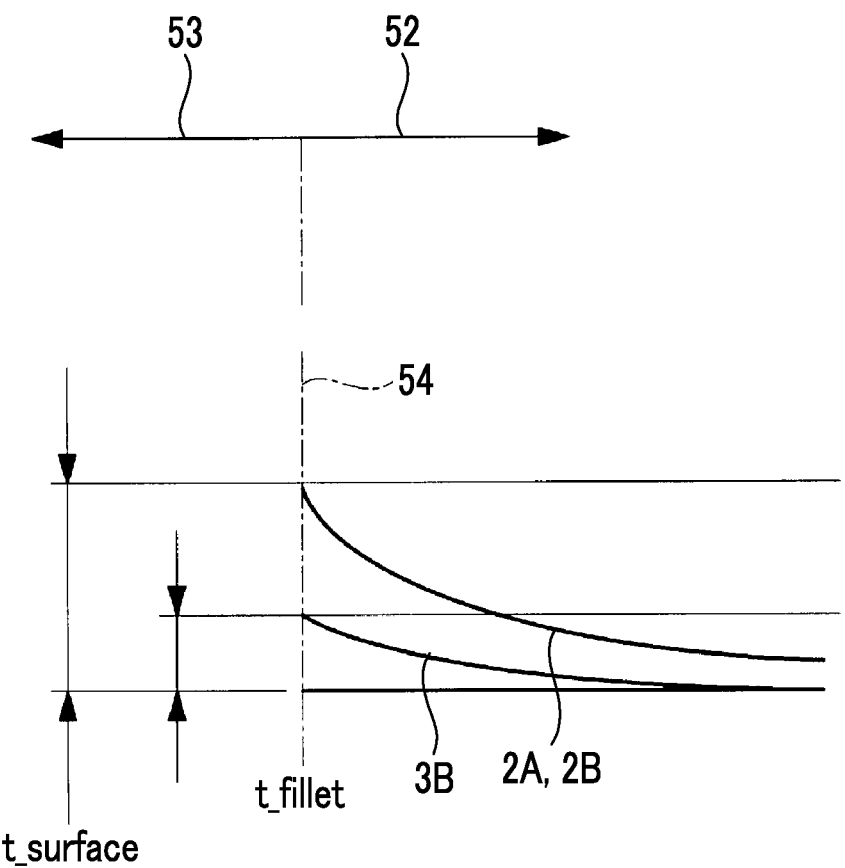
FIG. 5 is an enlarged cross-sectional view of a portion of the workpiece, which is formed by the processing device according to the embodiment of the present disclosure, near a boundary portion.

Further, the planar portion formation unit 6 controls the drive unit 4 so as to form only the planar portion 52, which includes a first fillet-shaped portion at 56A or 56B, on the workpiece 50 so that an unprocessed portion remains on the fillet-shaped portion 53 of a shape as a processing target as shown in FIGS. 4 and 5. Specifically, in a case where the planar portion 52 is to be formed, the planar portion formation unit 6 controls the drive unit 4 so as to form only the planar portion 52 so that an unprocessed portion, including, for example, an unprocessed portion between the first fillet-shaped portion 56A and the fillet-shaped portion 53, remains at the boundary portion 54 between the fillet-shaped portion 53 and the planar portion 52.

The thickness t_surface of a portion, which is unprocessed in the height direction by the bottom edges 2A or the radial edges 2B and remains at the boundary portion between the fillet-shaped portion 53 and the planar portion 52 in a case where only the planar portion 52 is formed before the formation of the fillet-shaped portion 53, is set to be larger than the thickness t_fillet of a portion that is unprocessed in the height direction by the radial edges 3B and remains at the boundary portion 54 between the fillet-shaped portion 53 and the planar portion 52 in a case where the fillet-shaped portion 53 is formed.

Figure 6:
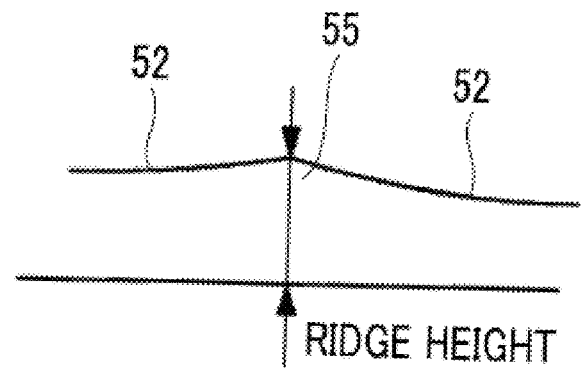
FIG. 6 is an enlarged cross-sectional view of a portion of the workpiece, which is formed by the processing device according to the embodiment of the present disclosure, near a ridge portion.

The fillet formation unit 7 controls the drive unit 4 so as to form the fillet-shaped portion 53 on the workpiece 50 by the radial edges 3B in a single pass. The planar portion formation unit 6 controls the drive unit 4 so that a convex ridge portion 55 shown in FIGS. 2 and 6 and protruding in the height direction is formed at a portion where a newly formed planar portion 52 overlaps with a planar portion 52 formed in the previous pass in a case where the fillet-shaped portion 53 is formed in a single pass.

A shape as a processing target to be formed on the workpiece 50 is a concave shape, and the concave shape includes the planar portion 52 and the fillet-shaped portions 53 adjacent to the planar portion 52. In a case where the drive unit 4 is controlled by the planar portion formation unit 6 to form only the planar portion 52, only the planar portion 52 is formed so that an unprocessed portion remains on the fillet-shaped portion 53.

Further, in a case where the drive unit 4 is controlled by the fillet formation unit 7 to form the fillet-shaped portion 53, the fillet-shaped portion 53 is formed in a single pass by the radial edges 3B that are provided at the corners and formed in the shape of an arc. In this case, the planar portion 52 is also formed by the bottom edges 3A. Accordingly, a boundary between the planar portion 52 and the fillet-shaped portion 53 is formed as a smoothly curved surface by the bottom edges 3A and the radial edges 3B without the formation of a stepped portion.

In a case where the radius of the arc-shaped portion of the radial edge 3B is equal to the radius of the fillet-shaped portion 53 as a processing target, a fillet-shaped portion 53 with high accuracy can be formed in a single pass. Further, in a case where the fillet-shaped portion 53 is formed in a single pass, the ridge portion 55 protruding in the height direction is formed at a portion where a newly formed planar portion 52 overlaps with a planar portion 52 formed in the previous pass.

In a case where the fillet-shaped portion 53 is formed in a single pass, the radius of the fillet-shaped portion 53 to be formed is the predetermined radius even though an error occurs in the position of the end mill 3. Accordingly, the fillet-shaped portion 53 to be formed fits a reference shape.

Further, since the bottom edges 2A and 3A have radii of curvature but the radii of curvature are larger than the tool diameters (outer diameters) of the end mills 2 and 3, the radius of curvature of a curved surface to be formed on the planar portion 52 is larger than the radius of curvature to be formed by a bull nose end mill or a ball end mill. For this reason, the planar portion 52 to be formed fits a reference shape.

Figure 7:
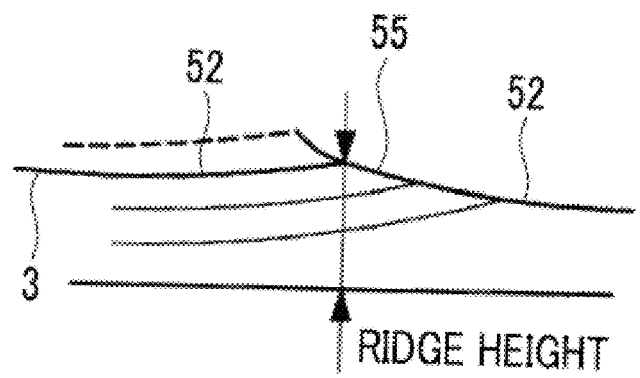
FIG. 7 is an enlarged cross-sectional view of a portion of the workpiece, which is formed by the processing device according to the embodiment of the present disclosure, near the ridge portion and shows states where the end mills are shifted in an axial direction.

Furthermore, the bottom edge 3A has a large radius of curvature. Accordingly, in a case where an error occurs in the position of the end mill 3, the amount of shift of the position of the ridge portion 55 to be formed in a horizontal direction is larger than the amount of shift of the position of the end mill 3 in the height direction but the amount of shift of the position of the ridge portion 55 to be formed in the height direction is smaller than the amount of shift of the position of the end mill 3 in the height direction as shown in FIG. 7. Therefore, the planar portion 52 to be formed also fits a reference shape.

The control unit 5 includes, for example, a Central Processing Unit (CPU), a Random Access Memory (RAM), a Read Only Memory (ROM), a computer-readable storage medium, and the like. Further, since a series of processing for realizing various functions are stored in a storage medium or the like in the form of a program by way of example, various functions are realized in a case where the CPU reads the program on the RAM or the like and performs processing/calculation of information. A form where a program is installed in a ROM or other storage mediums in advance, a form where a program is provided in a state where the program is stored in a computer-readable storage medium, a form where a program is delivered through wired or wireless communication means, and the like may be applied to the program. The computer-readable storage medium is a magnetic disk, a magneto-optical disk, a CD-ROM, a DVD-ROM, a semiconductor memory, or the like.

In a case where the thickness of an unprocessed portion remaining at the boundary portion 54 between the fillet-shaped portion 53 and the planar portion 52 in a case where the planar portion 52 is formed is denoted by t_surface and the thickness of an unprocessed portion remaining at the boundary portion 54 between the fillet-shaped portion 53 and the planar portion 52 in a case where the fillet-shaped portion 53 is formed is denoted by t_fillet, the end mill 2 is selected to satisfy the following condition (Expression (1)).

$$t\_surface > t\_fillet \quad (1)$$

Here, the thickness t of a remaining unprocessed portion is represented by Expression (2). LR denotes the radii of the arc-shaped portions of the bottom edges 2A and 3A, and LD denotes the diameters of the regions of the end mills 2 and 3, which are occupied by the bottom edges 2A and 3A, in directions perpendicular to the axial directions of the end mills 2 and 3.

$$t = f(LR, LD) = LR - \sqrt{LR^2 - \frac{LD^2}{4}} \quad (2)$$

Even in a case where Expression (1) is not satisfied in the selection of the end mill 2, an adjustment may be performed using the offset of the end mill 2 in an axial direction or a radial direction to adjust the position of the end mill 2 so that an unprocessed portion remaining at the boundary portion 54 between the fillet-shaped portion 53 and the planar portion 52 is formed. For example, the position of the end mill 2 in the axial direction is adjusted so that the left side of Expression (3) is increased, and the planar portion 52 is formed.

$$t\_surface + \alpha > t\_fillet \tag{3}$$

Here, $\alpha$ denotes the amount of shift of the end mill 2 in the axial direction.

In a case where the radius of curvature of the arc-shaped portion of the bottom edge 2A is equal to or close to the radius of curvature of the planar portion 52 having a concave shape as a processing target in the processing of the workpiece 50 using the end mill 2, the thickness t of a remaining unprocessed portion is close to 0 (zero). On the other hand, in a case where the radius of curvature of the planar portion 52 as a processing target is large and is close to a planar shape, an unprocessed portion remains. In the present embodiment, the fact that the thickness of a remaining unprocessed portion is generated in the processing result obtained from the bottom edge 2A including an arc-shaped portion can be used to perform processing so that a stepped portion is not formed on the planar portion 52 and the fillet-shaped portion 53.

Next, the operation of the processing device 1 according to the present embodiment will be described with reference to FIG. 2.

A workpiece 50 and the processing device 1 are prepared to form a predetermined shape on the workpiece 50. For example, the workpiece 50 is installed on a fixing jig, and the processing device 1 is moved to the workpiece 50 installed on the fixing jig.

Then, the end mills 2 and 3 are driven on the workpiece 50 at a predetermined rotation speed and a predetermined moving speed. In the present embodiment, a predetermined shape is formed on the workpiece 50, that is, a concave shape formed in the depth direction is formed on the workpiece 50.

Figure 8:
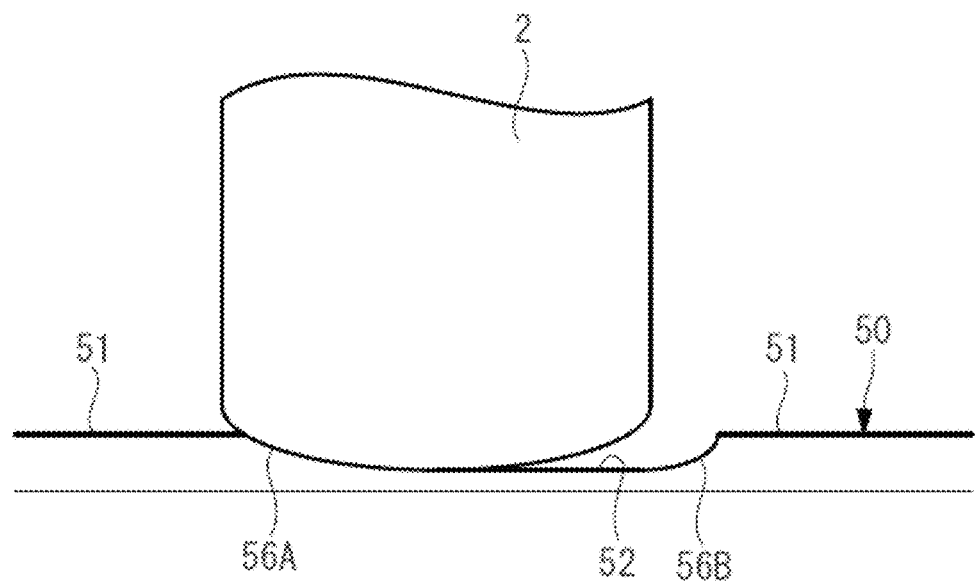
FIG. 8 is a longitudinal sectional view showing the end mill of the processing device according to the embodiment of the present disclosure and the workpiece.

First, as shown in FIG. 8, a planar portion 52 corresponding to the bottom of a concave portion is formed on the workpiece 50 using the bottom edges 2A of the end mill 2. In this case, a fillet-shaped portion 53 is not formed and only the planar portion 52 is formed on the workpiece 50 so that an unprocessed portion remains on the fillet-shaped portion 53 of a shape as a processing target. Specifically, only a planar portion 52 is formed so that an unprocessed portion remains at a boundary portion 54 between a fillet-shaped portion 53 and the planar portion 52.

Figure 9:
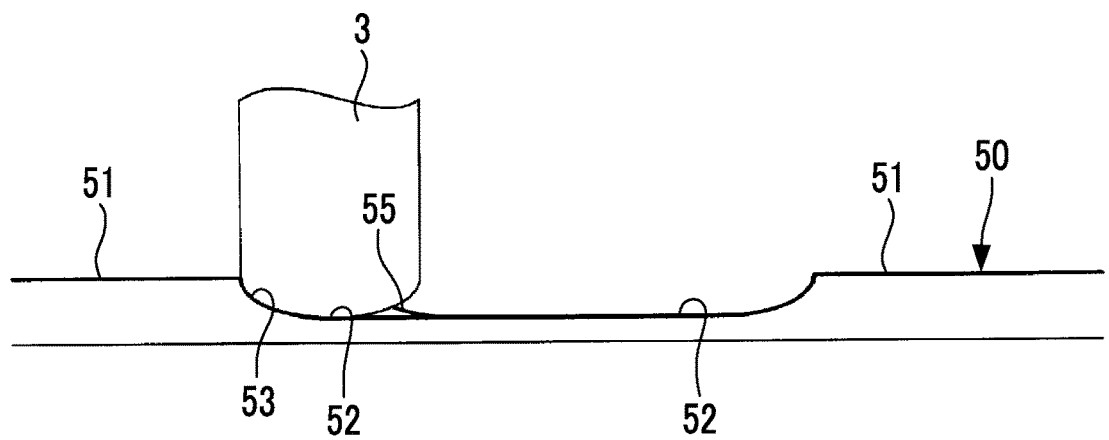
FIG. 9 is a longitudinal sectional view showing the end mill of the processing device according to the embodiment of the present disclosure and the workpiece.
Figure 10:
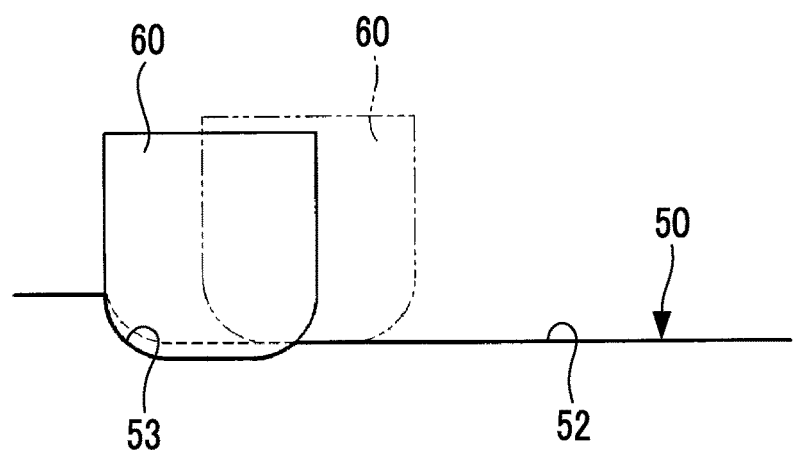
FIG. 10 is a longitudinal sectional view showing an end mill of a processing device in the related art and a workpiece.
Figure 11:
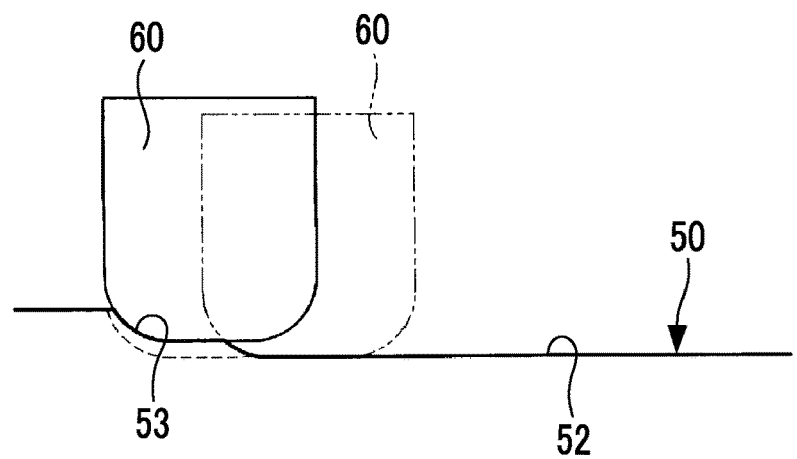
FIG. 11 is a longitudinal sectional view showing the end mill of the processing device in the related art and the workpiece.

Next, as shown in FIG. 9, a fillet-shaped portion 53 is formed on the workpiece 50 using the radial edges 3B of the end mill 3 in a single pass. In a case where the radius of the arc-shaped portion of the radial edge 3B is equal to the radius of the fillet-shaped portion 53 as a processing target, a fillet-shaped portion 53 with high accuracy can be formed in a single pass.

In a case where the planar portion 52 is formed by the bottom edges 3A in a pass for forming the fillet-shaped portion 53, the planar portion 52 is formed so that a ridge portion 55 protruding in the height direction is formed at a portion where a newly formed planar portion 52 overlaps with a planar portion 52 formed in the previous pass. Accordingly, a ridge portion 55 is formed at a portion where a newly formed planar portion 52 overlaps with a planar portion 52 formed in the previous pass. Therefore, the ridge portion 55 is formed on the planar portion 52 side of the boundary portion 54 between the fillet-shaped portion 53 and the planar portion 52. That is, the ridge portion 55 is formed on the planar portion 52 of the concave shape of the formed component.

Since the fillet-shaped portion 53 is formed by the radial edges 3B and the planar portion 52 is formed by the bottom edges 3A in a pass for forming the fillet-shaped portion 53, the planar portion 52 and the fillet-shaped portion 53 are formed of only smoothly curved surfaces without flat surfaces on the fillet-shaped portion 53 side of the ridge portion 55. Accordingly, in a case where the fillet-shaped portion 53 is formed in a single pass, a boundary between the planar portion 52 and the fillet-shaped portion 53 is formed as a smoothly curved surface by the bottom edges 3A and the radial edges 3B without the formation of a stepped portion.

According to the present embodiment, a stepped portion (overcutting or remaining uncutting) is not formed on the fillet-shaped portion 53 and the planar portion 52 formed by machining as described above. Further, in a case where the fillet-shaped portion 53 is to formed, the shift of the position of the ridge portion 55 in the height direction is small even though the shift of the position of the end mill 2 in the height direction occurs. Accordingly, the fillet-shaped portion 53 and the planar portion 52 can be formed in an ideal shape that is the same as or close to a processing target. As a result, there is no concern that the fatigue strength of a formed structural component may be reduced. Furthermore, since it is difficult for a component formed by the present embodiment to deviate from a reference shape, work for correcting a shape by additional work, such as sanding, is reduced or is unnecessary.

REFERENCE SIGNS LIST

1: processing device
2: end mill
2A: bottom edge
2B: radial edge
3: end mill
3A: bottom edge
3B: radial edge
4: drive unit
5: control unit
6: planar portion formation unit
7: fillet formation unit
8: end mill-switching control unit
50: workpiece
51: rib
52: planar portion
53: fillet-shaped portion
54: boundary portion
55: ridge portion
60: end mill

The invention claimed is:

1. A method of manufacturing a component using a processing device including a plurality of end mills, each of the end mills including a respective bottom edge formed in a curved convex shape and including a respective end cutting edge provided at a corner of the corresponding one of the end mills, each of the end cutting edges being formed in a shape of an arc, wherein a processing target is formed on the component, the processing target including a fillet-shaped portion of the processing target, the fillet-shaped portion being in a shape of an arc having a predetermined radius, and the processing target also including a planar portion that is adjacent to the fillet-shaped portion of the processing target, the method comprising:

processing a first fillet-shaped portion via one of the plurality of end mills and forming a first planar portion adjacent to the first fillet-shaped portion via the bottom edge of the one of the plurality of end mills so that an unprocessed portion remains on the processing target; and forming the fillet-shaped portion of the processing target via using the end cutting edge of another one of the plurality of end mills different from the one of the plurality of end mills to remove material from the first fillet-shaped portion in a single pass, such that the component has the processing target formed thereon, wherein the end mills are corner-radius end mills, and the planar portion of the processing target and the first planar portion are flat surfaces without curvature or are curved surfaces having curvature.

2. The method of manufacturing a component according to claim 1, wherein in the forming of the first planar portion, the first planar portion is formed so that the unprocessed portion remains at a boundary portion between the first fillet-shaped portion and the first planar portion.

3. The method of manufacturing a component according to claim 1, wherein a portion, which is unprocessed in a height direction and remains at a boundary portion between the first fillet-shaped portion and the first planar portion during the forming of the first planar portion, is set to be larger than a portion that is unprocessed in the height direction by the end cutting edge of the another one of the plurality of end mills and that remains at the boundary portion in the forming of the fillet-shaped portion of the processing target in a single pass.

4. The method of manufacturing a component according to claim 1, wherein a second planar portion is formed in the forming of the fillet-shaped portion of the processing target in a single pass, and a ridge portion protruding from the second planar portion in a height direction is formed at a portion where the second planar portion overlaps with the first planar portion formed in the step of forming of the first planar portion.

5. The method of manufacturing a component according to claim 1, wherein the component comprises
the planar portion of the processing target, and
the fillet-shaped portion of the processing target,
the fillet-shaped portion of the processing target is adjacent to the planar portion of the processing target and has curvature different from curvature of the planar portion of the processing target,
a convex portion is formed in a height direction so as to be located on a portion of the processing target that is closer to the planar portion of the processing target than to a boundary portion between the fillet-shaped portion of the processing target and the planar portion of the processing target, and
the boundary portion between the planar portion of the processing target and the fillet-shaped portion of the processing target is formed of no stepped portion and is a portion where the curvature of the planar portion of the processing target and the curvature of the fillet-shaped portion of the processing portion are changed.

* * * * *